United States Patent [19]

Nomaki et al.

[11] 4,112,868
[45] Sep. 12, 1978

[54] SOLDERING APPARATUS

[75] Inventors: Koji Nomaki; Yoshihito Saoyama, both of Yokohama, Japan

[73] Assignee: Asahi Glass Company, Ltd., Tokyo, Japan

[21] Appl. No.: 786,193

[22] Filed: Apr. 11, 1977

Related U.S. Application Data

[62] Division of Ser. No. 689,527, May 24, 1976, Pat. No. 4,042,725.

[51] Int. Cl.$^2$ ................................................. B05C 3/05
[52] U.S. Cl. .................................... 118/429; 118/612
[58] Field of Search ................... 118/57, 621, 56, 429, 118/612; 228/11 A; 310/323; 266/242, 280, 283; 432/264; 427/431–433; 29/57

[56] References Cited

U.S. PATENT DOCUMENTS

| | | | |
|---|---|---|---|
| 2,970,933 | 2/1961 | Barera et al. | 427/57 |
| 3,287,158 | 11/1966 | Whitfield | 427/431 |
| 3,313,914 | 4/1967 | Roberts, Jr. et al. | 118/7 X |
| 3,401,026 | 9/1968 | Walker et al. | 427/57 X |
| 3,554,512 | 1/1971 | Elliott et al. | 432/264 X |
| 3,617,348 | 11/1971 | Kelley et al. | 432/264 X |

*Primary Examiner*—Morris Kaplan
*Attorney, Agent, or Firm*—Oblon, Fisher, Spivak, McClelland & Maier

[57] ABSTRACT

A difficultly solderable metal of iron, nickel, copper or an alloy thereof having an oxide surface is soldered by dipping in a bath of a molten solder alloy consisting essentially of 15 to 98% by weight of Zn, 85 to 2% by weight of Sn, 0.01 to 0.5% by weight of Al and 0 to 5% by weight of Ag to which ultrasonic vibration is applied. The bath structure comprises a vessel, a tip element for imparting ultrasonic vibration and a block member for concentrating the ultrasonic vibration. Said element and member being fabricated of a metal selected from the group consisting of tantalum, niobium, molybdenum, tungsten and an alloy thereof having at least one of these metals as the main component.

3 Claims, 4 Drawing Figures

SOLDERING APPARATUS

This is a division of application Ser. No. 689,527 filed May 24, 1976, now U.S. Pat. No. 4,042,725.

BACKGROUND OF THE INVENTION

1. Field of the Invention

The present invention relates to an apparatus for firmly soldering difficultly solderable metal of iron, nickel, copper or an alloy thereof having an oxide surface with a solder alloy.

2. Description of the Prior Arts

It has been difficult to directly apply a solder to an oxide surface of iron, nickel, copper or an alloy thereof. For example, a lead frame of an electron display tube which is used for displaying numerical symbols in a portable computer etc., is made of nickel or iron alloy thereof and the surface thereof is oxidized so as to have high affinity to a solder glass in the case of air-tight sealing of the display tube. Accordingly, it is difficult to directly solder the conventional Pb-Sn type solder to the lead frame. Accordingly, an auxiliary lead pieces made of nickel or copper is welded to the lead frame and then the terminal is soldered to the auxiliary lead pieces.

Instead of welding, it has been known to solder a solder alloy by removing a part of oxide membrane by treating a lead frame with an acid and bonding the solder alloy with a flux which contains a strong acid such as hydrochloric acid and then removing the flux by washing it with water. These methods have needed many steps and a complicated step and cause low efficiency in the soldering operations.

SUMMARY OF THE INVENTION

It is an object of the present invention to provide a process for directly applying a solder to difficultly solderable metal of iron, nickel, copper or an alloy thereof having an oxide surface.

The apparatus of the invention is utilized by using a solder alloy comprising zinc, lead, aluminum and silver and applying ultrasonic vibration during the soldering operation.

DESCRIPTION OF THE PREFERRED EMBODIMENTS

Figure 1:
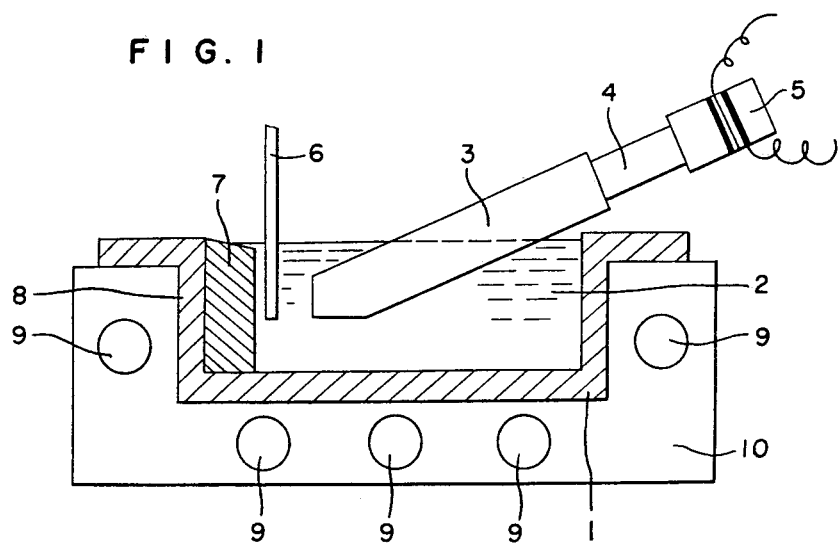
FIG. 1 is a sectional view of an apparatus for soldering by applying ultrasonic vibration according to the invention.

The solder alloy of the invention is characterized by essentially consisting of 15 to 98% by weight of Zn, 85 to 2% by weight of Sn, 0.01 to 0.5% by weight of Al and 0 to 5% by weight of Ag.

The reasons of the limitation of the composition of the solder alloy of the invention are as follows.

Zn and Sn are main components of the solder alloy, and Zn forms a diffusion layer of alloy by a mutual diffusion with the difficultly solderable metal and is indispensable for imparting firmly bonding. Sn is indispensable for secondarily soldering a conventional Pb-Sn type solder alloy to the layer formed by the novel solder alloy.

If the quantity of Zn in the solder alloy is less than 15% by wt. (Sn > 85%), the desired bonding effect is not achieved. If the quantity of Zn in the solder alloy is more than 98% by wt. (Sn < 2%), it is hard to achieve the secondarily soldering.

Al is effective for preventing an oxidation on a solder alloy.

If the quantity of Al in the solder alloy is more than 0.01% by wt., the effect is achieved, however if it is more than 0.5% by wt., the bonding strength of the solder alloy is disadvantageously low.

Ag is not an indispensable component, however if more than 0.5% by wt. of Ag is added, the effect for improving the secondarily solderability is achieved. It is possible to add up to 5% by wt. of Ag. If the quantity of Ag is more than 5% by wt., the bonding strength is disadvantageously low. The following composition as expressed in weight percent is especially preferred.

| | |
|---|---|
| Zn | 18 – 80% |
| Sn | 20 – 72% |
| Al | 0.01 – 0.03% |
| Ag | 0.5 – 3% |

The solder alloy of the invention has a melting point of 200° C to 400° C. Accordingly, the solder alloy can be soldered by heating at higher than the melting point and contacting the molten solder alloy on an oxide surface of the difficultly solderable metal, in accordance with the conventional manners.

In the preferable embodiment of the invention, it is possible to form the solder alloy layer on an oxide surface of difficultly solderable metal of iron, nickel, copper or an alloy thereof by dipping it in the bath of molten solder alloy under applying ultrasonic vibration without using a flux for a short time.

In said case, in order to prevent an oxidation of the molten solder alloy, it is preferable to maintain the molten solder alloy bath in an inert or reducing atmosphere such as inert gas e.g. carbon dioxide, argon gas etc., or inert gas containing up to 10% of hydrogen.

When the ultrasonic vibration is applied to the bath of molten solder alloy, it is preferable that a tip (or probe) equipped at a top of a vibration transferring part (horn) connected to an ultrasonic vibrator is dipped in the bath of molten solder alloy to directly transfer the vibration to the bath. It is possible to transfer the ultrasonic vibration to the vessel for the bath of molten solder alloy.

Satisfactory results can be obtained by applying the ultrasonic vibration at a frequency of 20 to 100 KHz in a total amplitude of about 1 to 40 μ. The soldering part is dipped in the bath of molten solder alloy to which the ultrasonic vibration is applied. The time for dipping is usually shorter than 10 seconds and preferably 1 to 5 seconds.

Referring to the drawings, especially FIG. 1 of an apparatus of the invention, the reference 10 designates a body; 1 designates a vessel; 9 designates a heater for melting the solder alloy which is disposed around the vessel 1, 2 designates a bath of molten solder; 3 designates a tip for ultrasonic vibration, and the top of the tip is dipped in the bath of molten solder 2 to impart the ultrasonic vibration to it. A horn 4 for transferring the ultrasonic vibration is connected to the tip 3 and an ultrasonic oscillator 5 is connected to the horn. The soldering material 6 is dipped in the bath of molten solder near the top of the tip 3. The reference 7 designates a dummy block which is used for concentrating the ultrasonic vibration for transferring from the tip to the bath, upon the soldering material 6 and which is disposed on or along the side wall 8 of the vessel so as to put the soldering material 6 between the tip 3 and the dummy block.

The tip and the dummy block which are contacted with the bath of molten solder alloy should be made of tantalum, niobium, molybdenum, tungsten or an alloy having at least one of said components as main component. The vessel is made of tantalum, tungsten, molybdenum, or an alloy having at least one of said components as main component.

The metal or alloy of the parts of the tip and the dummy block and the vessel which contact with the bath of molten solder alloy does not react with the solder alloy especially the Zn-Sn-Al type or Zn-Sn-Al-Ag type solder alloy.

Even though certain alloy is formed, the mutual diffusing speed is quite slow at the temperature for soldering operation.

Accordingly, there is no trouble in a practical operation.

Figure 2:
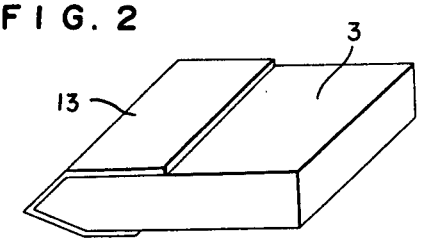
FIG. 2 is a schematic view of a tip for applying ultrasonic vibration by dipping in a bath of molten solder alloy.
Figure 3:
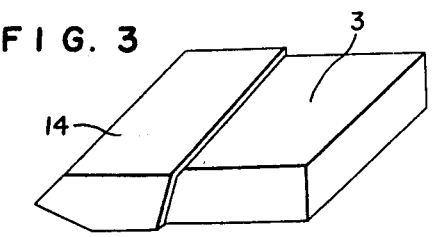
FIG. 3 is a schematic view of another type of tip for applying ultrasonic vibration and FIG. 4 is a sectional view of a vessel having a coated silicon layer which contains a molten solder alloy.

FIGS. 2 and 3 show other embodiments of tip. A protector made of said anticorrosive metal or alloy is disposed to cover the top of tip which is dipped in the bath of molten solder alloy.

In the embodiment of FIG. 2, a cover type protector 13 is disposed at the top of the tip 3. In the embodiment of FIG. 3, a cap type protector 14 is disposed at the top of tip 3.

In the case of FIG. 2, the side surface of the tip 3 is contacted with the bath of molten solder alloy to result slight corrosion.

However, the maximum amplitude of the ultrasonic vibration is given at the top of tip, and the part of tip for providing highest corrosion is protected. Accordingly, there is no trouble in the practical operation. In the embodiment, the body of tip can be made of steel, stainless steel, 13 chromium stainless steel, 18 chromium stainless steel and the like. The dummy block is also easily corroded by the molten solder alloy. Accordingly, it is preferable to cover at least the surface of the dummy block with said anticorrosive metal or alloy. Thus, it is possible to be made of non-metallic refractory material such as alumina because no function for propagating ultrasonic vibration is required.

In some case, it is operated without a dummy block though the slight decrease of efficiency for concentrating the ultrasonic vibration to the soldering material, is found.

Figure 4:
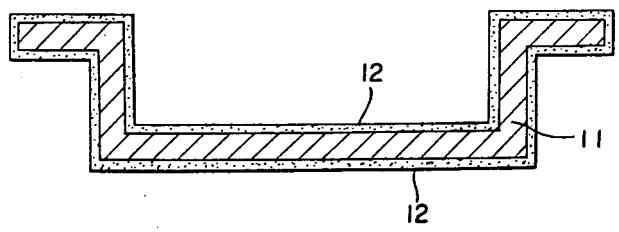

FIG. 4 is a sectional view of the other embodiment of the vessel. A coated silicon layer 12 is formed on the surface of the vessel 11 made of tantalum, tungsten, molybdenum or an alloy having at least one of the components as main component.

On the surface of the vessel 11 having the coated silicon layer 12, $TaSi_2$, $MoSi_2$, $WSi_2$, etc. is formed.

The coated silicon layer imparts excellent result at high temperature especially for antioxidation.

In the preparation of the coated silicon layer, metallic silicon is coated on the surface of the vessel made of said anticorrosive metal or alloy by the vacuum deposition method, the chemical deposition method, or the plasma spray method. At the part for imparting higher bonding strength, it is possible to for the coated silicon layer by diffusion-treating at about 1300° to 1400° C for several hours in vacuum or in an inert gas.

The invention will be further illustrated by certain examples.

EXAMPLE 1

A primary solder layer was soldered on a lead frame made of Ni-Fe alloy (42% Ni component) having an oxide surface.

The solder alloy consisting of 77% by wt. of Zn, 20% by wt. of Sn, 3% by wt. of Ag and 0.02% by wt. of Al. (melting point 380° C) was used.

The bath of molten solder alloy was heated at 450° C and was maintained in an atmosphere of $N_2$ containing 7% of $H_2$ in order to prevent the oxidation. The lead frame was dipped for 3 seconds in the bath of molten solder alloy under applying ultrasonic vibration at 20 KHz in 150 W from an ultrasonic oscillator. As the result, the primary solder layer having a thickness of about 0.01 mm was formed on the surface of lead frame. As one of the bonding strength tests, the lead frame having the primary solder layer was bent to break it and the broken surface of the lead frame was observed to find the formation of peeling of the primary solder layer. No peeling phenomenon was found.

The lead frame was bonded through the primary solder layer to the lead wire made of copper with the conventional Pb-Sn eutectic solder. According to the tensile test of the product, the lead wire was broken without peeling off the primary solder layer from the lead frame.

EXAMPLE 2

In accordance with the process of Example 1, a primary solder layer was formed on the surface of the lead frame of 18 chromium stainless steel having an oxide surface. The solder alloy consisting of 70% by wt. of Zn, 30% by wt. of Sn and 0.02% by wt. of Al (melting point 375° C) was used.

The bath of molten solder alloy was heated at 420° C and was maintained in an atmosphere of nitrogen gas.

The conditions of the ultrasonic vibration were same with those of Example 1 and the lead frame was dipped in the bath for 4 seconds to form the primary solder layer having a thickness of about 0.02 mm. In accordance with the test of Example 1, the tensile test of the product was carried out.

As the result, the lead wire was broken without peeling off the primary solder layer from the lead frame.

EXAMPLE 3

A solder alloy consisting of 18% by wt. of Zn, 80% by wt. of Sn, 2% by wt. of Ag and 0.02% by wt. of Al (melting point 275° C) was soldered on a lead wire of a reed switch which is made of copper and had an oxide surface (diameter 0.5 mm; length 15 mm), by dipping the lead wire in the bath of molten solder alloy at 350° C for 3 seconds under applying the ultrasonic vibration of 20 KHz. As the result, a solder layer having a thickness of 0.02 mm was formed.

In accordance with the bending test of Example 1, no peeling of the solder layer was found.

The lead wire having the primary solder layer was dipped in a bath of the conventional eutectic solder consisting of 60% by wt. of Pb and 40% by wt. of Sn for 20 seconds to form the eutectic solder layer. According to the bending test, no peeling of the solder layer was found.

EXAMPLE 4

(1) A solder alloy consisting of 77% by wt. of Zn, 20% by wt. of Sn, 0.02% by wt. of Al and 3% by wt. of Ag was charged and melted in a vessel made of stainless steel at 450° C.

A lead frame made of Ni-Cr-Fe alloy comprising 42% by wt. of Ni and 6% by wt. of Cr having an oxide surface was dipped in the bath of molten solder alloy to solder it.

When the tip for imparting ultrasonic vibration and the dummy block were respectively made of mild steel, 18 chromium stainless steel or 18-8 stainless steel, and the ultrasonic vibration of 20 KHz was continuously applied to the tip under dipping the top of the tip in the bath, pits having a diameter of about 0.6 mm i.e. small holes developed by corrosion were formed after 30 minutes and the tip was corroded to a thickness of 5 mm after 3 hours. Both of the tip and the dummy block could not be further usable.

(2) When the tip and the dummy block which are made of tantalum were used and the ultrasonic vibration of 15 KHz was applied to the bath of molten solder alloy at 430° C, no corrosion of the tip and the dummy block was found after 30 minutes and 3 hours. After 400 hours, a corrosion of the tip and the dummy was block uniformly formed in a thickness of 0.5 mm however, there was no trouble in the practical operation.

(3) A lead wire made of copper having an oxide surface was dipped in a bath of molten solder alloy by using the tip and the dummy block which are made of stainless steel and are covered with tantalum in a thickness of 1 mm.

When a solder alloy consisting of 18% by wt. of Zn, 82% by wt. of Sn, 0.03% by wt. of Al was used under applying the ultrasonic vibration of 20 KHz to the bath at 350° C, no corrosion of the tip and the dummy block was found after 30 minutes and 3 hours. After 400 hours, a corrosion of the tip and the dummy block was uniformly formed in a thickness of 0.5 mm, however there was no trouble in the practical operation.

(4) In accordance with the process of Example 4-(3) except using a cover made of niobium having a thickness of 2 mm, and dipping a lead wire made of iron having an oxide surface in a bath of molten solder alloy consisting of 18% by wt. of Zn, 82% by wt. of Sn and 0.02% by wt. of Al at 350° C under applying the ultrasonic vibration of 20 KHz, the test was carried out.

No corrosion of the tip and the dummy block was found after 3 hours. After 400 hours, a corrosion of the tip and the dummy block was uniformly formed in a thickness of 0.5 mm, however there was no trouble in the practical operation.

(5) In accordance with the process of Example 4-(4), the tip and the dummy block which are made of Mo-30W alloy were used and the lead wire made of iron having an oxide surface was dipped in the bath of molten solder alloy at 470° C under applying the ultrasonic vibration of 21 KHz, to solder it.

No corrosion of the tip and the dummy block was found after 3 hours. After 400 hours, a corrosion of the tip and the dummy block was uniformly formed in a thickness of only 0.1 mm.

EXAMPLE 5

(1) A vessel made of stainless steel having a thickness of 1.5 mm and a solder alloy consisting of 77% by wt. of Zn, 20% by wt. of Sn, 0.02% by wt. of Al and 3% by wt. of Ag were used. A lead frame made of Ni-Cr-Fe alloy comprising 42% by wt. of Ni and 6% by wt. of Cr having an oxide surface was dipped in the bath of molten solder alloy at 450° C under continuously applying the ultrasonic vibration of 20 KHz to solder it. As the results, pits having a diameter of about 0.5 mm were formed after 420 minutes.

After 21 hours, the vessel was corroded in a thickness of 1 mm in average and the vessel could not be further usable.

(2) Each vessel made of tantalum, molybdenum or tungsten having a thickness of 1.0 mm was used and the ultrasonic vibration having 19.5 to 20.0 KHz was applied in the bath of molted solder alloy at 500° C, 525° C, or 550° C.

The durable times to the corrosion and oxidation of vessels caused by the solder alloy at high temperature were as shown in Table 1.

Table 1

| Temperature | 500° C | 525° C | 550° C |
| --- | --- | --- | --- |
| Vessel made of tantalum | hr. 2,600 | hr. 670 | hr. 240 |
| Vessel made of molybdenum | hr. 2,500 | hr. 270 | hr. 200 |
| Vessel made of tungsten | hr. 3,000 | hr. 1,800 | hr. 260 |

(3) When a vessel made of 30% tungsten-molybdenum alloy having a thickness of 1 mm was used and the ultrasonic vibration of 19.5 to 20.0 KHz was applied to the bath of molten solder alloy at 470° C, no corrosion of the vessel was found after 2,000 hours.

(4) A vessel made of molybdenum having a thickness of 1.0 mm was used and silicon powder (150 to 325 mesh) was melt-injected by using plusma flame under 65 volts and 450 amperes in an atmosphere of nitrogen gas flow at 100 feets$^3$/hour and hydrogen gas flow at 10 feets$^3$/hour, whereby a coated silicon layer having a thickness of 0.1 mm was formed. The solder alloy was charged in the vessel having the coated silicon layer and the ultrasonic vibration having 19.0 to 21.0 KHz was applied to the bath of molten solder alloy at 520° C. No corrosion nor oxidation of the vessel was found and no abnormal condition was found after 2000 hours.

We claim:

1. In an apparatus for providing a solder layer on a surface of a soldering material by dipping the soldering material in a bath of molten solder while applying ultrasonic vibration to the molten solder bath, the improvement which comprises a vessel for the bath of molten solder, a tip for imparting ultrasonic vibration to the bath of molten solder in the bath, and a dummy block for concentrating the ultrasonic vibration between the tip for imparting the ultrasonic vibration and a side wall of the vessel, wherein the dummy block concentrator and at least part of the tip are composed of a metal selected from the group consisting of tantalum, niobrium, molybdenum, tungsten and an alloy thereof having at least one of those metals as the main component.

2. The apparatus of claim 1, wherein the vessel is composed of a metal selected from the group consisting of tantalum, tungsten, molybdenum, and an alloy thereof having at least one of these metals as the main component.

3. The apparatus according to claim 2, wherein a coated silicon layer is formed on the inner surface of the vessel.

* * * * *